US006011486A

United States Patent [19]

Casey

[11] Patent Number: 6,011,486

[45] Date of Patent: Jan. 4, 2000

[54] ELECTRONIC PAGING DEVICE INCLUDING A COMPUTER CONNECTION PORT

[75] Inventor: M. Sean Casey, New South Wales, Australia

[73] Assignee: Intel Corporation, Santa Clara, Calif.

[21] Appl. No.: 08/991,311

[22] Filed: Dec. 16, 1997

[51] Int. Cl.$^{7}$ .................................................... H04Q 7/14

[52] U.S. Cl. .................................... 340/825.44; 708/109

[58] Field of Search ......................... 340/825.44, 825.07, 340/311.1; 455/31.3, 38.4, 575, 351; 395/750.01; 361/814; 708/109

[56] References Cited

U.S. PATENT DOCUMENTS

| | | | |
|---|---|---|---|
| 4,951,044 | 8/1990 | Nelson | 340/825.44 |
| 5,302,947 | 4/1994 | Fuller | 340/825.44 |
| 5,414,596 | 5/1995 | Eaton | 361/814 |
| 5,444,869 | 8/1995 | Stricklin | 455/575 |
| 5,510,778 | 4/1996 | Krieter | 340/825.44 |
| 5,512,886 | 4/1996 | Macko | 340/825.07 |
| 5,638,540 | 6/1997 | Aldos | 395/750.01 |

OTHER PUBLICATIONS

USB Univeral Serial Bus Specification, V. 1.0, Jan. 15, 1996, pp. 1–267.

USB (Universal Serial Bus), Home Page, "The Simple and Flexible Way To Connect External Devices To Your Desktop or Notebook PC", Downloaded from http://www.usb.org, Oct. 30, 1997, 2 pp.

*Primary Examiner*—Edwin C. Holloway, III

*Attorney, Agent, or Firm*—Blakely, Sokoloff, Taylor & Zafman LLP

[57] ABSTRACT

An electronic paging device has a port including a plurality of conductors to connect to a computer system, and interface logic to assert and receive signals on the plurality of conductors to transfer data to and from the computer system.

20 Claims, 8 Drawing Sheets

ELECTRONIC PAGING DEVICE INCLUDING A COMPUTER CONNECTION PORT

FIELD OF THE INVENTION

The present invention relates to the field of electronic paging, and more particularly to an electronic paging device that includes a port for connection to a computer.

BACKGROUND OF THE INVENTION

Electronic pagers are small, lightweight, wireless communication devices for receiving messages. Electronic pagers typically include a radio frequency (RF) receiver, a processor, a user-interface, a non-volatile memory and an operating memory. Two-way pagers, i.e., pagers that can both receive and transmit data, also include a RF transmitter. The processor, which is often a microcontroller or a digital signal processor (DSP), executes program code stored in the non-volatile memory to process information received via the RF receiver and to respond to input from a user via the user-interface. The user-interface typically consists of a small, low-power display to display received messages (e.g., liquid crystal, light-emitting diode, etc.) and one or more buttons to receive user input. The buttons may be used, for example, to scroll the display to view a sequence of messages, to clear messages, to configure the pager, and, in the case of a two-way pager, to send a response to a message.

When first introduced, electronic pagers were used mostly by businesses, for example, to communicate with field sales and service personnel. Since that time, electronic pagers and associated broadcasting services have become much more affordable. As a result, electronic pagers are increasingly being used for more personal purposes, including maintaining contact with family and friends and receiving information from personal service providers. For example, services are available that periodically transmit stock quotes to an electronic pager. Such services can also transmit a notification that a requested transaction has taken place (e.g., sell stock when it reaches 85 and then notify by page). As another example, messages may be e-mailed to a site on the World Wide Web which then broadcasts the messages via a centralized transceiver. This way, an electronic page may be issued by e-mail.

A significant limitation of many modern pagers is that information, once received, cannot be easily communicated to the pager user's computer. For example, suppose that a pager user maintained a database of stock pricing information on a personal computer (e.g., an IBM, IBM compatible, Apple Macintosh, Macintosh compatible computer, etc.). In most cases, the user would be unable to transfer stock pricing information received by the electronic pager to the data base on the personal computer without manual data entry.

SUMMARY OF THE INVENTION

An electronic paging device is disclosed that includes a port having a plurality of conductors to connect to a computer system. Interface logic in the electronic paging device asserts and receives signals on the plurality of conductors to transfer data to and from the computer system.

DESCRIPTION OF THE DRAWINGS

The present invention is illustrated by way of example and not limitation in the figures of the accompanying drawings in which like references indicate similar elements and in which.

DETAIL DESCRIPTION

In various embodiments of the present invention, an input/output (I/O) port and supporting interface logic is included in an electronic paging device. The I/O port includes a connector that mates to a connector on or connected to a host computer. Logic in the host computer or a device connected to the computer detects connection of the electronic paging device to the computer and issues signals on the I/O port to request the electronic paging device to transfer data to the computer. The electronic paging device responds by transferring data stored therein to the computer via the I/O port. The data transferred to the computer by the electronic paging device can then be used to update a database maintained on the computer. In this way, a database of information on the computer can be automatically updated by the act of connecting the electronic paging device. In alternative embodiments, additional functionality is achieved by virtue of the I/O port connection of the electronic paging device to the computer.

Figure 1:
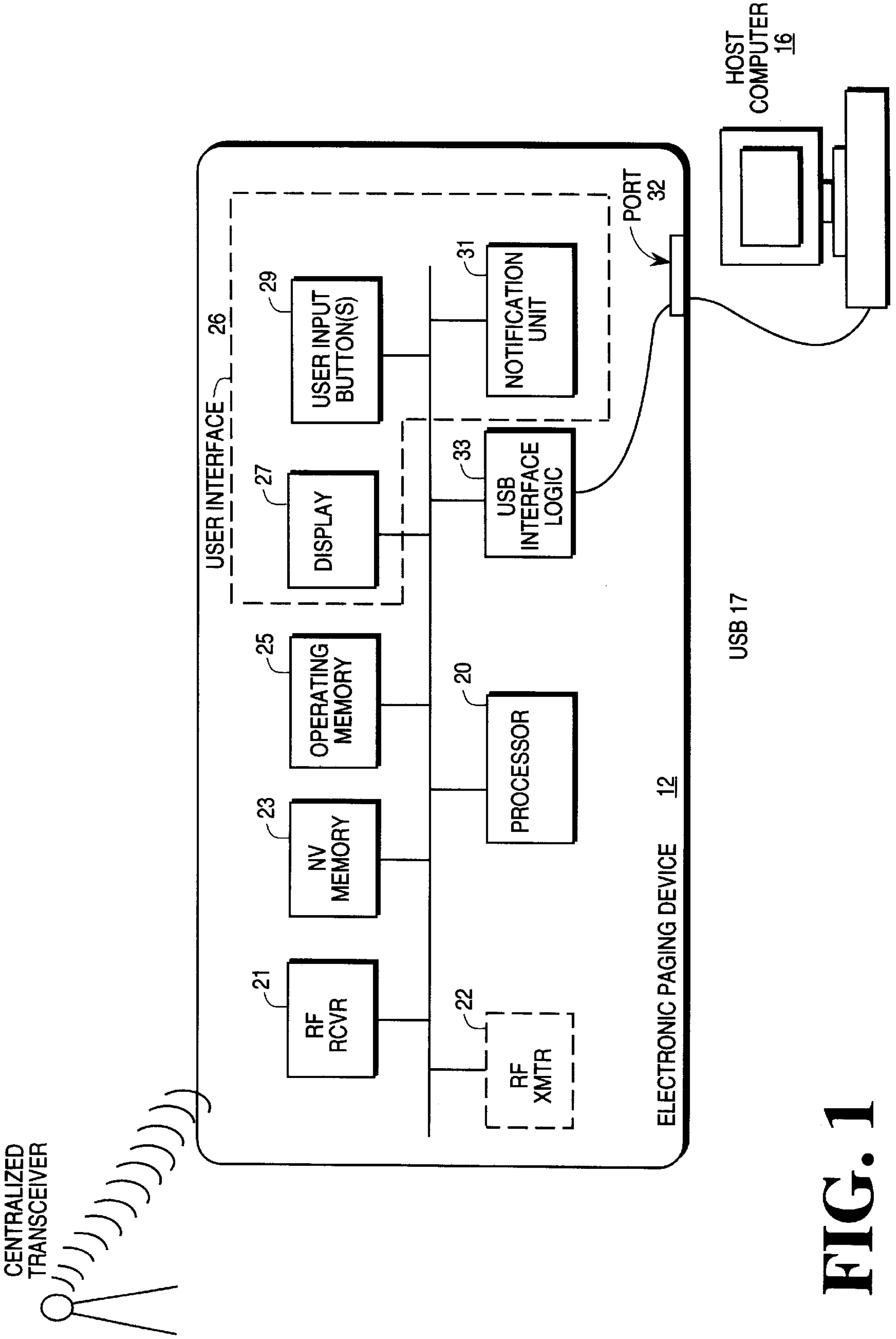
FIG. 1 is a diagram of an electronic paging device.

FIG. 1 is a diagram of an electronic paging device according to one embodiment of the present invention. The electronic paging device 12 includes a processor 20, a non-volatile memory 23, an operating memory 25, a user interface 26, a RF receiver 21 and Universal Serial Bus (USB) interface logic 33. The electronic paging device may also optionally include a RF transmitter 22.

The processor 20, which may be a microprocessor, microcontroller, digital signal processor or other data processing device, executes program code stored in the non-volatile memory 23 to control various pager functions, including processing incoming and outgoing data and responding to user-input. In many cases input data will first be transferred to the operating memory 25 (a random access semiconductor memory in at least one embodiment) where it is further operated upon by the processor 20. The operating memory 25 may also be used to hold intermediate processing results and data structures such as call stacks, tables, linked lists, and so forth.

In one embodiment, the user interface 26 includes a low-power display 27 (e.g., a liquid crystal display), a notification unit 31 (e.g., a beeper, vibrator, etc.) and one or more user-input buttons 29. The user-input buttons 29 may be used for various functions including scrolling through a list of messages, configuring pager operation (e.g., enabling or disabling optional pager features) and, in the case of a pager that includes a RF transmitter, initiating a predetermined message to be sent to a centralized transceiver 14. In some cases, the user-input buttons 29 may even constitute a small keyboard to allow the user to type in messages to be sent to the centralized transceiver 14.

As shown in FIG. 1, the centralized transceiver 14 transmits RF signals which are received and demodulated by the RF receiver of the electronic paging device 12 to generate an input data stream. The processor 20 samples the input data stream under program control to determine if the data stream includes messages addressed to the electronic paging device 12. If the processor 20 detects a message that is addressed to the electronic paging device 12, the processor 20 writes the message to the display 27 and activates the notification unit 31 to notify the user. As discussed below, the processor 20 may also store the message in the non-volatile memory 23 for later recall.

According to one embodiment, the USB interface logic 33 is coupled to a port 32 on the electronic paging device 12 that is adapted for connection to a USB cable 17. A host computer 16 that is connected to the USB cable 17 may then communicate commands and data to the electronic paging device 12 according to a predefined protocol. Herein, "USB" refers to a bus having electrical, mechanical and communications characteristics according to a published USB Specification, including the "Universal Serial Bus Specification", Revision 1.0, published Jan. 15, 1996 by Compaq Computer Corporation, Digital Equipment Corporation, IBM PC Company, Intel Corporation, Microsoft Corporation, NEC and Northern Telecom. As discussed below, a number of useful functions are achieved by virtue of the USB connection between the host computer 16 and the electronic paging device 12. For example, commands communicated to the electronic paging device 12 by the host computer 16 may include commands to upload data from the paging device 12, commands to the paging device 12 to transmit messages via the RF transmitter 22, commands to associate new response messages with user-input buttons 29 and so forth. These various functions are discussed below in greater detail. Herein, transferring data between a host computer and an electronic paging device refers to transferring commands, messages or other data between the host computer and the electronic paging device.

A significant advantage of using a USB to connect the electronic paging device 12 to the host computer 16 is that the USB is a non-proprietary, standard serial bus having well-defined mechanical and electrical characteristics and a well-defined communications protocol. Further, because the USB is supported by a number of major computer and computer equipment manufacturers, modern home and office computers often include a USB root hub (the primary connection of a host computer to a USB). Despite these advantages, however, and despite the fact that the following description refers primarily to the USB, other communication media and protocols (e.g., parallel port, RS232, RS485, ethernet, etc.) may be used in alternate embodiments of the present invention.

Figure 2:
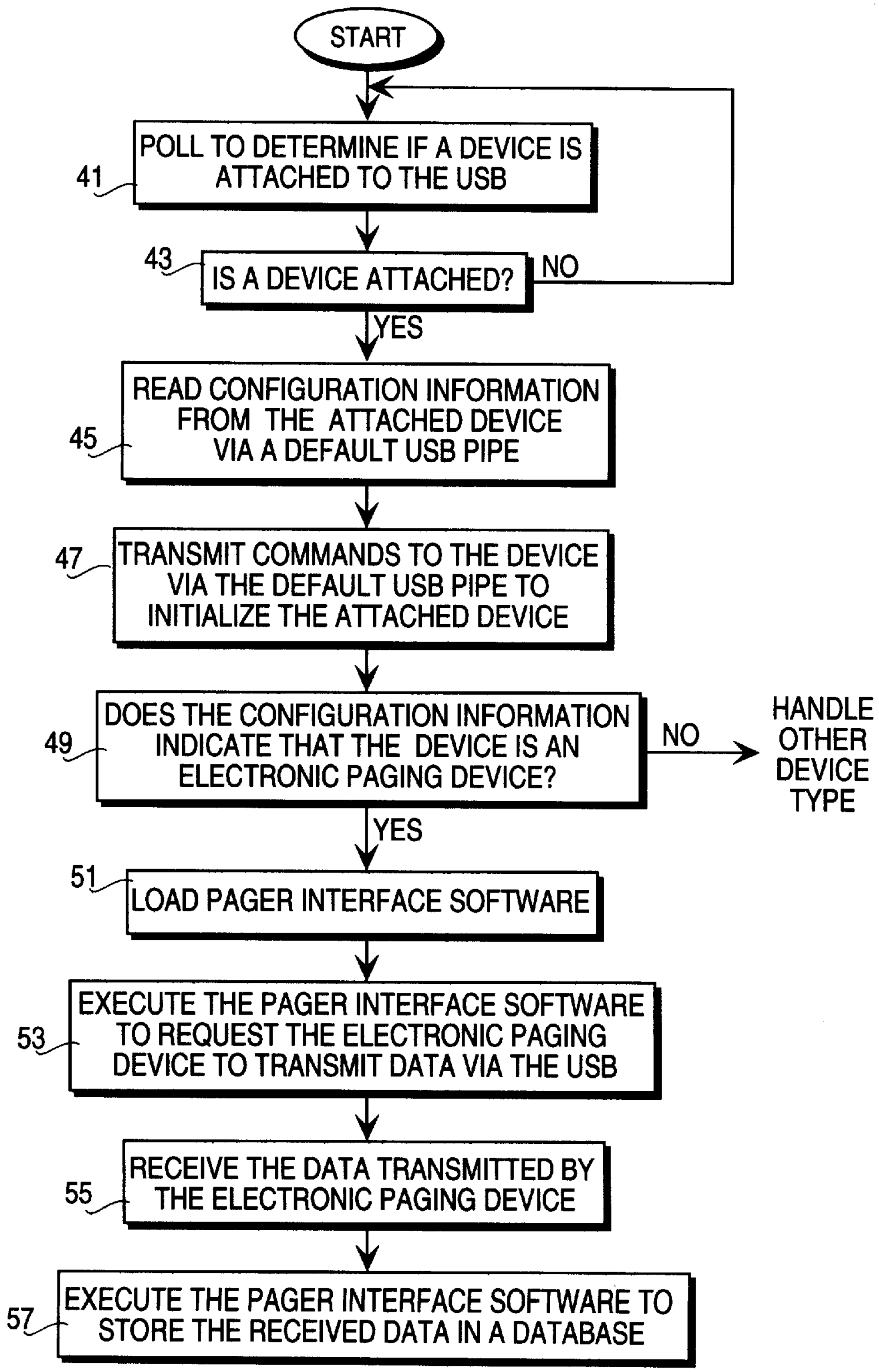
FIG. 2 is a flow diagram of host computer operation.

FIG. 2 is a flow diagram of host computer operation according to one embodiment. At step 41, the host computer polls the USB via the root hub to determine if a device has been attached to the USB. Devices on the USB are connected to the host computer in a tiered topology with at least one USB hub being present in each tier (except possibly the bottom tier which may consist entirely of functional devices). A USB hub is a USB component that provides additional USB attachment ports, and the root hub is the top tier USB hub provided by the host computer. Thus, when the host computer polls the USB via the root hub, the polling operation is propagated throughout the USB topology to determine if devices have been newly attached (or, if the host computer is being powered up, what devices are attached).

At decision step 43, if a device has not been attached, then polling continues at step 41. If a device has been attached or, in the power-up case, is first determined to be attached, then configuration information is read from the attached device via a default USB pipe at step 45. As an aside, a USB pipe is an association between a device endpoint and software executed on the host computer. A device endpoint is a portion of a USB device that terminates a communication channel to the host computer. In the electronic pager of FIG. 1, for example, the USB interface logic may be considered to be a device endpoint. Every device attached to the USB is required to have at least one endpoint referred to as "endpoint 0" to allow the USB host to identify and configure the USB device. The pipe between the host computer software and endpoint 0 of a device is called the "default pipe".

Returning to FIG. 2, at step 47, the host computer transmits commands to the device via the default USB pipe to initialize the attached device. The configuration information obtained by the host computer in step 45 includes identification information that can be used by the host computer to determine the nature of the attached device. Based on this determination, device-specific software may be loaded into the operating memory of the host computer and executed to further interface with the attached device. Thus, at step 49, the configuration information is examined to determine whether the attached device is an electronic paging device. If not, then execution branches to handle the alternate type of device. If the configuration information indicates that the attached device is an electronic paging device, then client software for interfacing with the electronic paging device is loaded into the operating memory of the host computer at step 51. At step 53, the pager interface software is executed by the host computer to request the electronic paging device to transmit data via the USB. At step 55, the requested data is received by the host computer and, at step 57, the pager interface software is executed to store the received data in a database. As used herein the term "database" refers to any association of data and is not limited to data maintained by a database application program.

To appreciate the usefulness of an electronic paging, device that has an interface for uploading data to a user's computer, consider the example of an electronic paging device that has received stock pricing information from a service provider. By connecting the electronic paging device to a host computer (e.g., the pager user's home or office computer) via the USB bus, the host computer is able to automatically detect the attachment event, identify the attached device as an electronic paging device and upload the stock pricing information. In this way, a database of information on the host computer can be accurately and efficiently updated.

Figure 3:
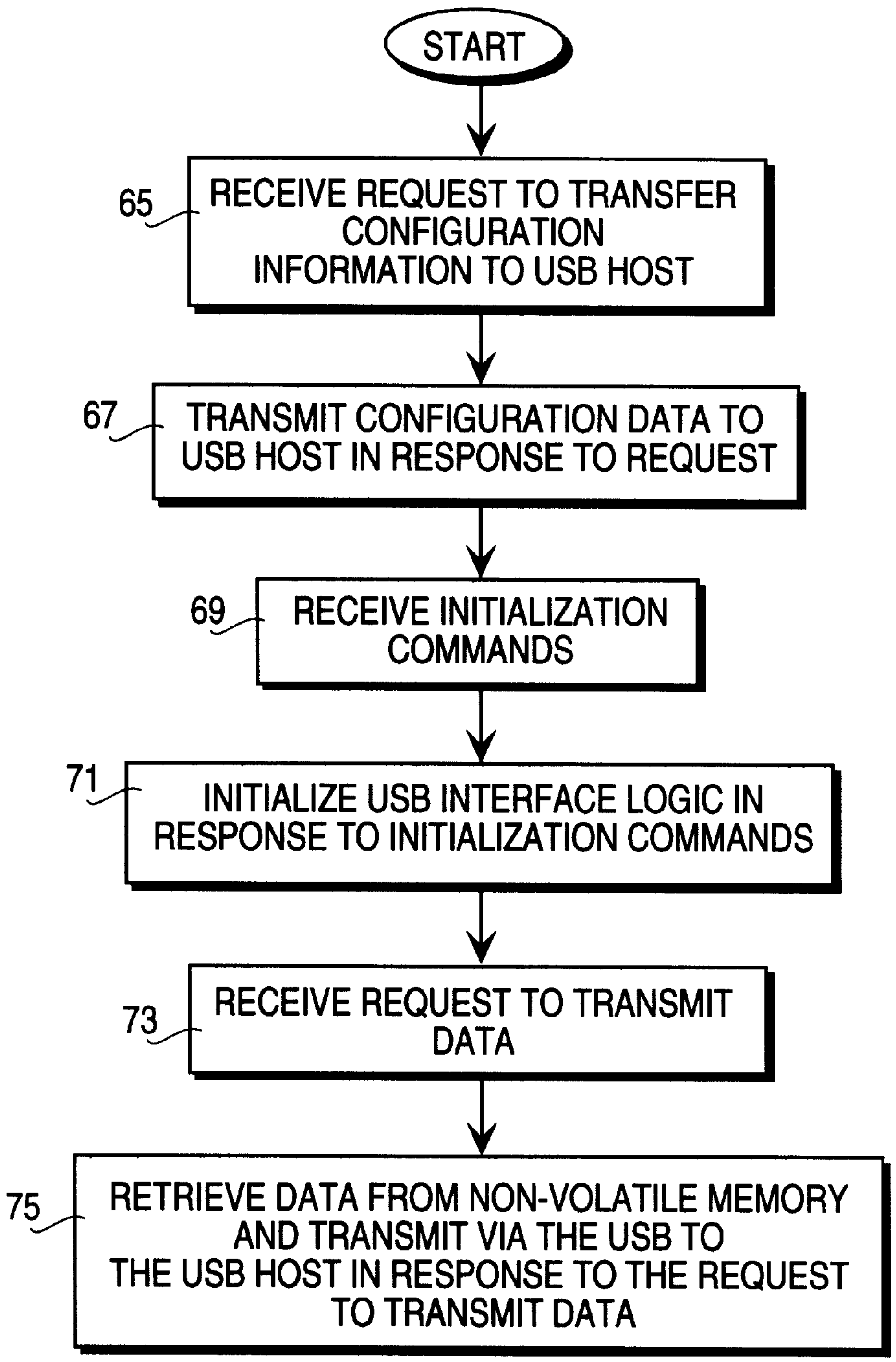
FIG. 3 is a flow diagram of electronic paging device operation.

FIG. 3 diagrams operation of an electronic paging device according to one embodiment that corresponds to the host computer operation of FIG. 2. At step 65, the electronic paging device receives a request to transfer configuration information to the USB host (which, in FIG. 2, is the host computer). At step 67, the electronic paging device transmits the configuration data to the USB host via the USB. At step 69, the electronic paging device receives initialization commands via the USB. According to USB device protocol, these commands include commands to transition the electronic paging device through a sequence of states to power, reset and configure the electronic paging device, and to assign a unique address to the electronic paging device for further communications (for initial communications a default address is used). The USB interface logic in the electronic paging device is initialized in response to the initialization commands at step 71. Note that steps 69 and 71 may be performed iteratively as a sequence of initialization commands are received.

At step 73, the electronic paging device receives a request to transmit data and, at step 75, the electronic paging device retrieves the requested data from the non-volatile memory and transmits the data via the USB to the USB host. As discussed above, the data may include message data received via the RF receiver.

Referring briefly to FIG. 2, recall that pager interface software is loaded to perform pager-specific functions. According to one embodiment, the electronic paging device includes program code which, when executed, implements a file manager that emulates a file manager for a rotating disk media. This is advantageous because it allows the electronic paging device to appear to the host computer to be simply another disk drive. Thus, the pager interface software may leverage existing operating system services for file input/output. Using this approach, pager-specific code is required only for pager-specific functions.

Figure 4:
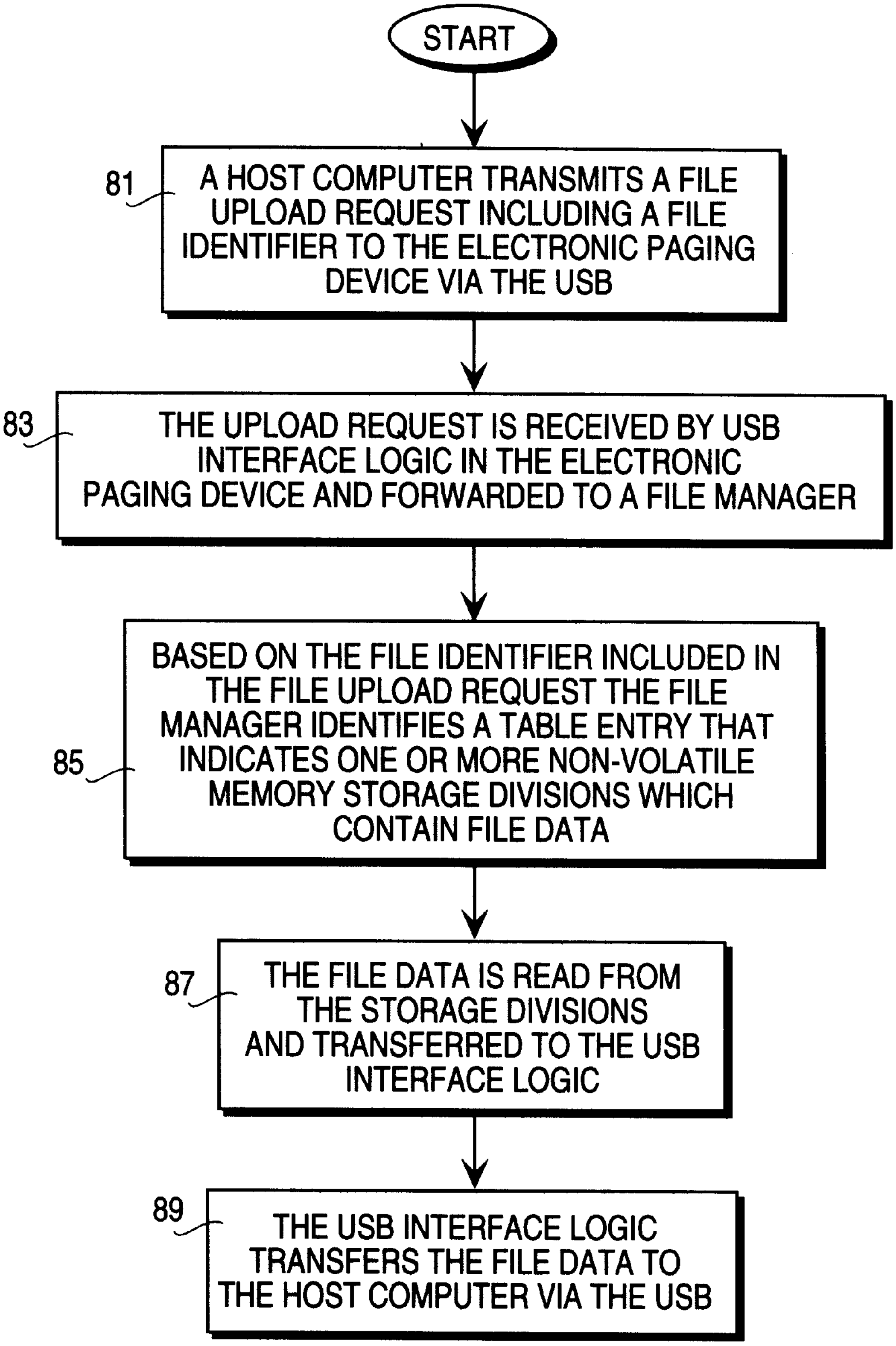
FIG. 4 is a flow diagram of a file upload operation.

FIG. 4 is a flow diagram of a file upload operation according to one embodiment. At step 81, a host computer transmits a file upload request including a file identifier to an electronic paging device. It is assumed that prior to transmission of the file upload request, the electronic paging device has been connected to the host computer and the USB interface in the electronic paging device has been initialized as discussed above. At step 83, the upload request is received by the USB interface logic in the electronic paging device and forwarded to a file manager. In one embodiment, the file manager is implemented by execution of file management software stored in the non-volatile memory of the electronic paging device. In an alternative embodiment, the file manager, or at least a portion of the file manager, may be implemented in hardwired logic.

At step 85, the file manager identifies a table entry that indicates one or more non-volatile storage divisions or sectors in the non-volatile memory of the electronic paging device that contain data from the file indicated by the file identifier (e.g., an entry in a file allocation table (FAT)). At step 87, the file data is read from the storage divisions of the non-volatile memory and transferred to the USB interface logic of the electronic paging device. At step 89, the USB interface logic transfers the file data to the host computer via the USB.

In one embodiment, the non-volatile memory is implemented by flash EEPROM (electrically-erasable read-only-memory) memory device. Unlike other types non-volatile semiconductor memory which often require two or more transistors per memory cell, each memory cell of a flash memory device is implemented by a single, floating-gate transistor. As a result, significantly more data can be stored on a flash memory device than on other non-volatile semiconductor memory devices of the same size. Another characteristic of flash memory is that, in most implementations, isolated memory cells cannot be erased (i.e., floating gate discharged). Instead, large portions of the flash memory, called blocks, must be erased together. In one embodiment, a file manager called a Flash Translation Layer (FTL) is used store and access files in a flash EEPROM memory according to a predetermined format (i.e., an FTL format). The FTL translates requests to access logical sectors containing file data into physical memory addresses and allocates blocks of the flash memory for file storage and update in such a way as to reduce the amount of flash block erasure required.

As discussed above, an electronic paging device may include a number of user-input buttons, one or more of which may be pressed to cause a predetermined message to be transmitted via a RF transmitter. Such buttons are referred to herein as "response buttons" because they are often used to respond to a page. According to one embodiment, the processor either polls or receives an interrupt to determine when one of the user-input buttons has been pressed. If a button has been pressed, the processor determines which button and looks up a message in the non-volatile memory at a location reserved for the button message. The message is, then transmitted via the RF transmitter. In an alternative embodiment, the electronic paging device transmits a short code associated with the pressed button, and the code is used by a central processing center to look up a message in a database of messages.

In one embodiment, the USB port and interface logic for connecting the electronic paging device to a host computer is also used to program new messages or new codes for the response buttons. In this way, messages associated with response buttons may be modified or entirely rewritten according to the pager user's needs. Also, codes may be programmed which index different messages in the database of messages maintained by a central processing center.

Figure 5:
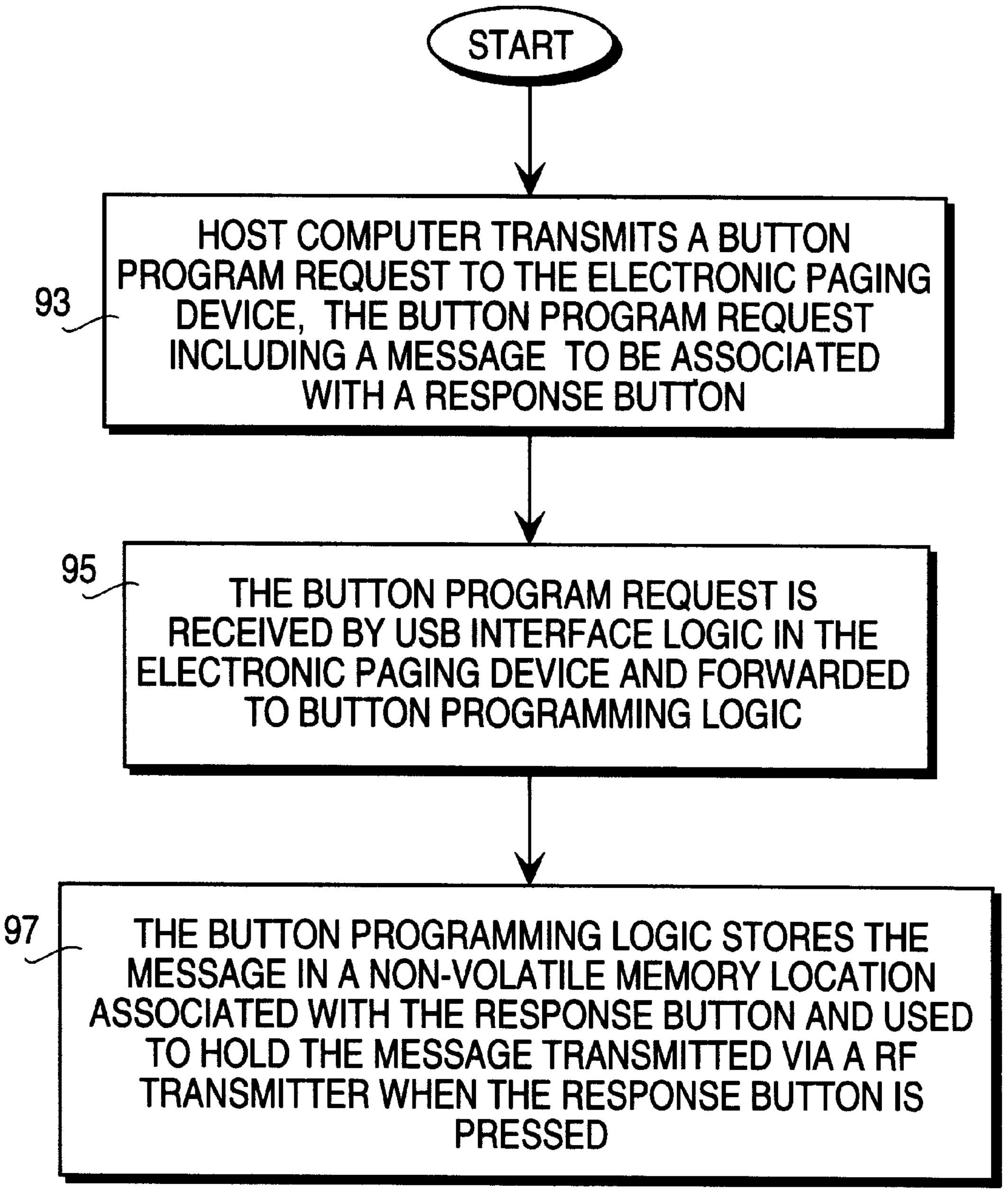
FIG. 5 is a flow diagram of a button programming operation.

FIG. 5 is a flow diagram of a button programming operation according to one embodiment. At step 93, the host computer transmits a button program request to the electronic paging device. The button program request includes a message or code to be associated with a response button. The message may have been entered by the user or selected from a database of response messages. At step 95, the button program request is received by the USB interface logic in the electronic paging device and forwarded to the button programming logic. In one embodiment, the button programming logic is implemented by execution of program code stored in the non-volatile memory of the electronic paging device. In an alternate embodiment the button programming logic, or at least a portion of the button programming logic may be implemented by hard-wired logic.

At step 97, the button programming logic stores the newly received message or code in a non-volatile memory location associated with the response button. If the response button is subsequently pressed, the message or code is read from the associated non-volatile memory location and transmitted via the RF transmitter.

Figure 6:
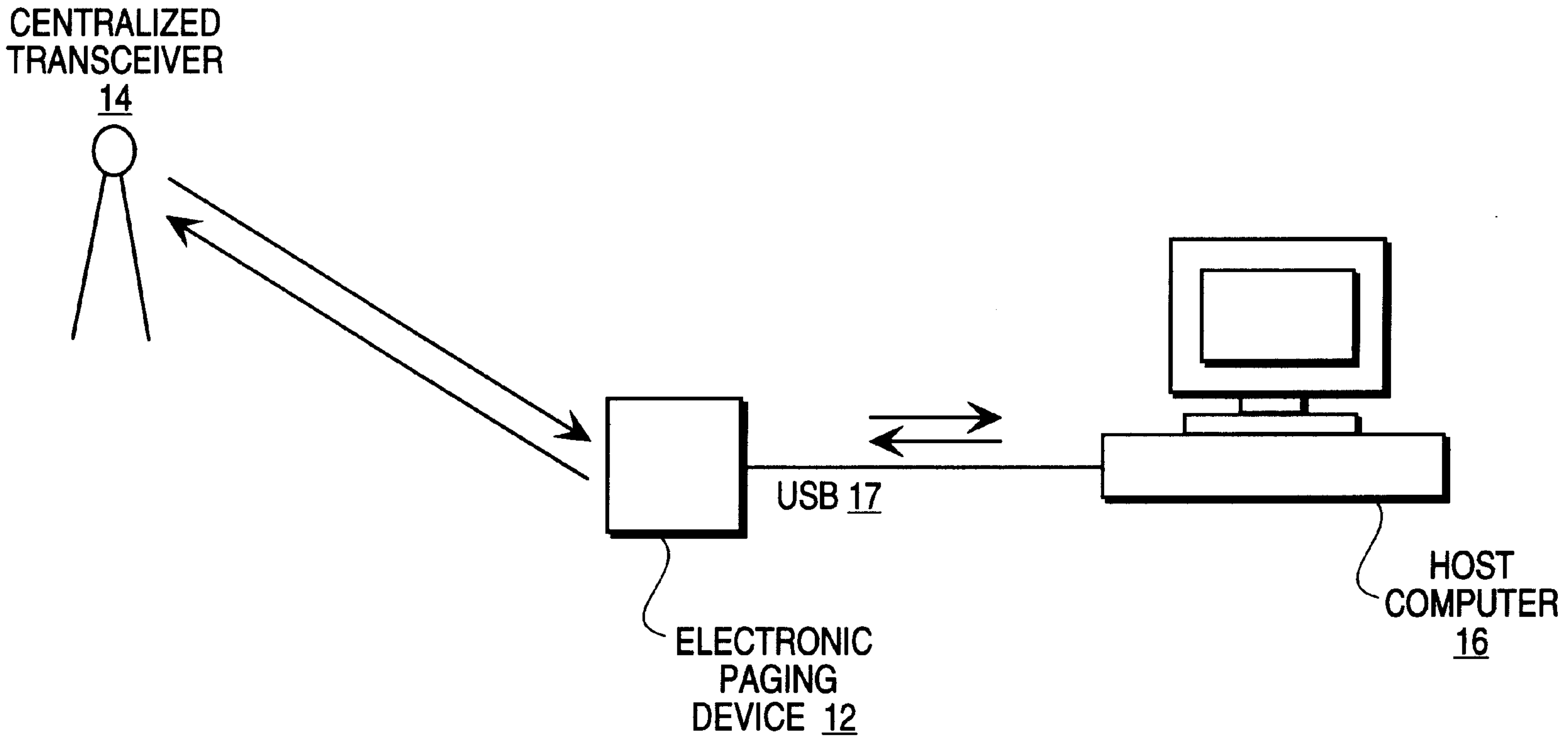
FIG. 6 illustrates the use of an electronic paging device as a wireless modem.

FIG. 6 illustrates the use of an electronic paging device 12 as a wireless modem. A host computer 16 may issue a sequence of commands to the electronic paging device 12 via the USB 17 to configure the electronic paging device to automatically transmit messages received via the RF receiver to the host computer and to automatically transmit messages received from the host computer via the RF transmitter. Thus, by virtue of connecting the electronic paging device to the host computer a wireless modem function is achieved, and the host computer is able to, for example, transmit messages to and receive messages from a centralized transceiver 14.

Figure 7:
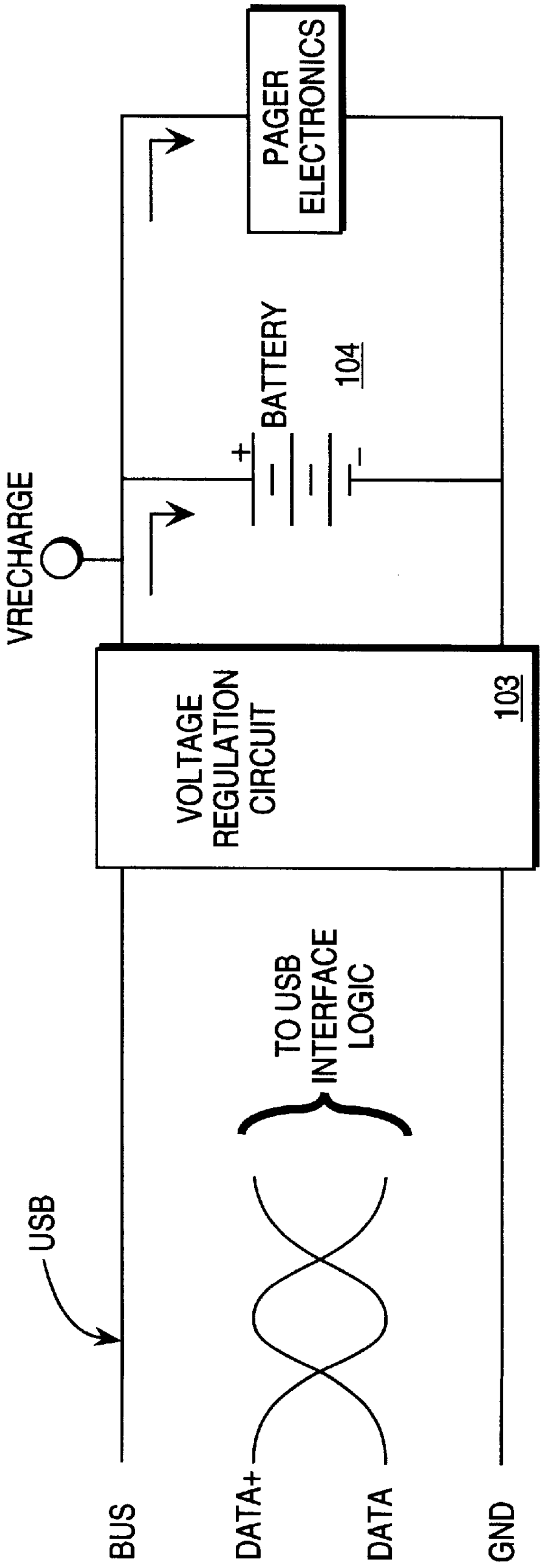
FIG. 7 illustrates use of a USB connection between a host computer and an electronic paging device to recharge the battery or batteries of the electronic paging device.

FIG. 7 illustrates use of the USB connection between the host computer and the electronic paging device to recharge the battery or batteries 104 of the electronic paging device. According to the USB specification, a USB cable includes four conductors: Vbus, Gnd, Data+ and Data−. By supplying Vbus and Gnd to a voltage regulation circuit 103 that outputs a regulated voltage (Vrecharge) at a somewhat higher potential than the voltage output by the batteries 104, the batteries 104 are recharged while the pager electronics are powered by the voltage regulation circuit 103 (and ultimately by the host computer or a USB hub).

Figure 8:
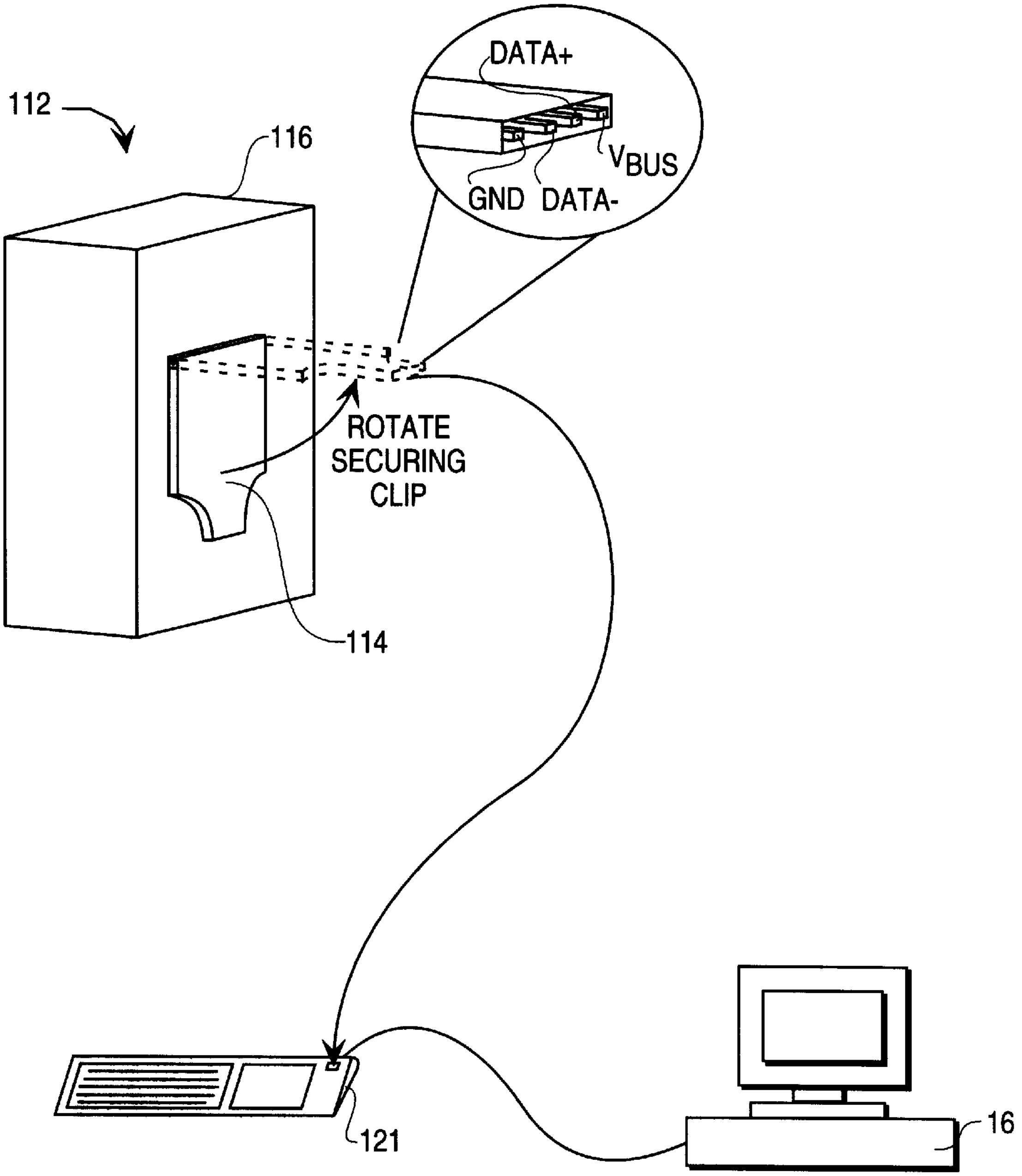
FIG. 8 depicts an electronic paging device housing including a securing clip adapted to form a USB connector.

FIG. 8 depicts the housing 112 of an electronic paging device according to one embodiment. As shown, the housing 112 includes a securing clip 114 with a one end adapted to form a USB connector. The other end of the securing clip 114 is rotatably mounted to the pager body 116 so that the securing clip 114 may be rotated between a first position and a second position. In the first position, indicated by the dashed-outline of the securing clip 114, the securing clip 114 can be plugged into a reciprocating USB receptacle, for example, on a keyboard 121 or other component of a host computer 16. In the second position, the securing clip 114 is rotated near to the pager body 116 so that securing clip 114 can be used to secure the electronic paging device to an article of clothing worn by the pager user. A cover may be used to cover the USB-adapted end of the securing clip 114 when it is in the second position. In an alternate embodiment, the electronic paging device may be connected to the USB by a cable or by a plug formed out of another portion of the pager housing.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

What is claimed is:

1. An electronic pager comprising:

a port including a plurality of conductors to connect to a computer system wherein at least one of the plurality of conductors is useful for conducting data to and from the computer system;

interface logic to assert and receive signals on the plurality of conductors to transfer data to and from the computer system;

a pager body that encapsulates the interface logic; and a securing clip coupled to the pager body to secure the pager to an article of clothing wherein the port including the plurality of conductors is embodied in the securing clip.

2. The electronic paging device of claim 1 wherein the port is a Universal Serial Bus port.

3. The electronic paging device of claim 1 further comprising file management logic to transfer data to the computer system in response to a file access request.

4. The electronic paging device of claim 1 further comprising:

a radio-frequency (RF) receiver; and a memory to store data received via the RF receiver, wherein when the electronic paging device is connected to the computer system via the port, the interface logic automatically transfers the data stored in the memory to the computer system via the port.

5. The electronic paging device of claim 1 wherein the securing clip includes a first end rotatably mounted to the pager body and a second end that is adapted to be connected to a reciprocating connector on the computer system.

6. The electronic paging device of claim 5 wherein the second end of the securing clip forms a plug that is received by a receptacle on the computer system.

7. The electronic paging device of claim 1 further comprising a receptacle to hold a rechargeable power source, and wherein the port further includes a conductor to deliver a charging current from the computer system to the rechargable power source.

8. The electronic paging device of claim 1 further comprising a radio frequency (RF) transmitter, wherein when the electronic paging device is connected to the computer system via the port, the interface logic, in response to transfer of data from the computer system via the port, transfers the data to the RF transmitter via an interconnection path from the port for transmission via the RF transmitter.

9. The electronic paging device of claim 8 further comprising a RF receiver wherein the interface logic automatically transfers the data from the RF receiver via an interconnection path to the port for transfer to the computer system.

10. The electronic paging device of claim 1 further comprising:

a radio frequency (RF) transmitter;

a response button that, when pressed, causes a text message associated with the response button to be transmitted via the RF transmitter; and programming logic to receive a text message from the computer system via the port and to associate the text message with the response button.

11. The electronic paging device of claim 1 further comprising:

a processor; and a non-volatile memory coupled to the processor and having stored therein program code which, when executed by the processor, causes the processor to implement a file management system that translates requests from the computer system to read sectors of a rotating disk into requests to read addresses of the non-volatile memory so that electronic paging device appears to the computer system to be a rotating-disk storage media.

12. The electronic paging device of claim 11 further comprising a radio-frequency (RF) receiver coupled to the processor, and wherein the file management system stores data received via the RF receiver in one or more files according to a Flash Translation Layer (FTL) format.

13. A method comprising the steps of:

detecting connection of an electronic paging device to a computer system via a port embodied in a securing clip coupled to the electronic paging device, the port including at least one conductor that transfers data to and from the computer system;

automatically loading program code into a memory of the computer system in response to detecting connection of the electronic paging device to the computer system;

executing the program code to request the electronic paging device to transfer data to the computer system; and transferring data from the electronic paging device to the computer system in response to the request.

14. The method of claim 13 wherein the step of automatically loading program code comprises the step of loading a device driver program into the memory of the computer system.

15. A method comprising the steps of:

connecting an electronic paging device to a computer system via a port embodied in a securing clip coupled to the electronic paging device, the port including at least one conductor that transfers data to and from the computer system;

automatically loading program code into a memory of the computer system via the port in response to connecting the electronic paging device to the computer system;

executing the program code to transfer data from the computer system to the electronic paging device via the port; and transmitting the data via a radio frequency (RF) transmitter included in the electronic paging device.

16. The method of claim 15 further comprising the steps of:

receiving data in the electronic paging device via a RF receiver; and transferring the received data to the computer system via the port.

17. A method comprising the steps of:

connecting an electronic paging device to a computer system via a port on the electronic paging device wherein the port includes a plurality of conductors wherein at least one conductor transfers data to and from the computer system;

transferring message data from the computer system to the electronic paging device via the port;

associating the message data transferred from the computer system to the electronic paging device with a response button on the electronic paging device; and transmitting the message data associated with the response button via a radio frequency (RF) transmitter in the electronic paging device when the response button is pressed.

18. The method of claim 17 wherein the step of associating the message data with a response button on the electronic paging device includes the step of overwriting previous message data associated with the response button.

19. An electronic paging device comprising:

means for connecting the electronic paging device to a computer system;

means for asserting and receiving signals on the means for connecting to transfer data to and from the computer system; and means for securing the electronic paging device to an article of clothing, wherein the means for connecting the electronic paging device to the computer system is embodied in the means for securing.

20. The electronic paging device of claim 19 further comprising means for receiving a radio frequency (RF) transmission;

means for storing data received via the means for receiving wherein when the electronic paging device is connected to the computer system via the means for connecting, the means for asserting and receiving signals, in response to detection of connection by the computer system, automatically transfers the data stored in the means for storing via a means for interconnection to the means for connection for transfer to the computer system.

* * * * *